US012631872B2

(12) United States Patent
Zhou et al.

(10) Patent No.: US 12,631,872 B2
(45) Date of Patent: May 19, 2026

(54) GRATING REGULATING DEVICE AND 3D DISPLAYING DEVICE

(71) Applicants: HEFEI BOE OPTOELECTRONICS TECHNOLOGY CO., LTD., Hefei (CN); BOE Technology Group Co., Ltd., Beijing (CN)

(72) Inventors: Ru Zhou, Beijing (CN); Hailin Xue, Beijing (CN); Sheng Wang, Beijing (CN); Yuansheng Zang, Beijing (CN); Xiaoqing Peng, Beijing (CN); Qianqian Zhang, Beijing (CN); Jinbo Xu, Beijing (CN); Shiming Shang, Beijing (CN); Yijun Wang, Beijing (CN); Xufei Xu, Beijing (CN); Baoman Li, Beijing (CN)

(73) Assignees: HEFEI BOE OPTOELECTRONICS TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 339 days.

(21) Appl. No.: 18/273,571

(22) PCT Filed: Jul. 29, 2022

(86) PCT No.: PCT/CN2022/109071
§ 371 (c)(1),
(2) Date: Jul. 21, 2023

(87) PCT Pub. No.: WO2024/021051
PCT Pub. Date: Feb. 1, 2024

(65) Prior Publication Data
US 2024/0393581 A1    Nov. 28, 2024

(51) Int. Cl.
*G02F 1/1335* (2006.01)
*G02B 27/00* (2006.01)
(Continued)

(52) U.S. Cl.
CPC ......... *G02B 27/0018* (2013.01); *G02B 30/26* (2020.01); *G02F 1/133531* (2021.01);
(Continued)

(58) Field of Classification Search
CPC ................ G02B 27/0018; G02B 30/26; G02F 1/133531; G02F 1/134345; G02F 1/13471; G02F 1/1396
See application file for complete search history.

(56) References Cited

U.S. PATENT DOCUMENTS

2006/0146208 A1\*  7/2006  Kim ....................... G02B 30/27
                                                          349/15
2012/0320292 A1   12/2012  Guo et al.
2014/0125893 A1    5/2014  Wu

FOREIGN PATENT DOCUMENTS

CN        102967965 A     3/2013
CN        103293726 A     9/2013
(Continued)

OTHER PUBLICATIONS

CN 103293726 A (Wu, Zhang-Ben et al.) machine translation (Year: 2013).\*

*Primary Examiner* — James A Dudek
(74) *Attorney, Agent, or Firm* — WHDA, LLP

(57) ABSTRACT
A grating regulating device is applied to a 3D displaying device. The 3D displaying device includes a display panel, the display panel includes a first polarizing unit, the grating regulating device is provided on one side of the display panel away from the first polarizing unit, and the grating regulating device includes: a first substrate and a second substrate, wherein the first substrate and the second substrate face each other; a second polarizing unit provided on one side of the second substrate away from the first substrate; and a third polarizing unit provided on one side of the first substrate away from the second substrate; and an absorption
(Continued)

axis of the first polarizing unit and an absorption axis of the second polarizing unit are perpendicular, and the absorption axis of the second polarizing unit and an absorption axis of the third polarizing unit are perpendicular.

11 Claims, 7 Drawing Sheets

(51) Int. Cl.
    *G02B 30/26*     (2020.01)
    *G02F 1/1343*     (2006.01)
    *G02F 1/1347*     (2006.01)
    *G02F 1/139*     (2006.01)
(52) U.S. Cl.
    CPC .... *G02F 1/134345* (2021.01); *G02F 1/13471*
                (2013.01); *G02F 1/1396* (2013.01)

(56)               References Cited

FOREIGN PATENT DOCUMENTS

| CN | 103995402 A | 8/2014 |
|----|-------------|--------|
| CN | 104865744 A | 8/2015 |
| CN | 106405852 A | 2/2017 |
| CN | 106950761 A | 7/2017 |
| CN | 109031809 A | 12/2018 |
| CN | 114488373 A | 5/2022 |

* cited by examiner 321   311

18

1

| not light-transmitting | light-transmitting | not light-transmitting | light-transmitting |

BM

22 viewpoint 1    viewpoint 2

200

100

GRATING REGULATING DEVICE AND 3D DISPLAYING DEVICE

TECHNICAL FIELD

The present application relates to the technical field of displaying, and particularly relates to a grating regulating device and a 3D displaying device.

BACKGROUND

With the development and progress in science and technology, the three-dimensional (3D) displaying technique has become a hot research field. Most of the conventional 3D displaying devices require the user to wear 3D glasses to watch, which is very troublesome and results in a poor user experience. Therefore, naked-eye 3D displaying devices, which can reach the effect of 3D displaying without wearing 3D glasses, have been paid attention to.

However, currently, naked-eye 3D displaying devices frequently have the problem of ghosting in usage, which results in a poor user experience.

SUMMARY

The embodiments of the present application employ the following technical solutions:

In an aspect, an embodiment of the present application provides a grating regulating device, where the grating regulating device is applied to a 3D displaying device, the 3D displaying device includes a display panel, the display panel includes a first polarizing unit, the grating regulating device is provided on one side of the display panel away from the first polarizing unit, and the grating regulating device includes:

a first substrate and a second substrate, where the first substrate and the second substrate face each other;

a second polarizing unit provided on one side of the second substrate away from the first substrate; and a third polarizing unit provided on one side of the first substrate away from the second substrate; and an absorption axis of the first polarizing unit and an absorption axis of the second polarizing unit are perpendicular, and the absorption axis of the second polarizing unit and an absorption axis of the third polarizing unit are perpendicular.

Optionally, the grating regulating device further includes an electrode layer, and the electrode layer is provided on one side of the first substrate away from the third polarizing unit; and an included angle θ between the absorption axis of the third polarizing unit and an extension direction of the electrode layer satisfies 0°<θ<180°, and θ≠90°.

Optionally, the extension direction of the electrode layer is parallel to the first substrate; or the absorption axis of the third polarizing unit is parallel to the first substrate.

Optionally, if the absorption axis of the third polarizing unit is parallel to the first substrate, the electrode layer extends in a same direction.

Optionally, if the absorption axis of the third polarizing unit is parallel to the first substrate, the electrode layer includes a plurality of electrode parts, and neighboring instances of the plurality of electrode parts are electrically connected; and each of the plurality of electrode parts includes a first sub-electrode part and a second sub-electrode part, the first sub-electrode part and the second sub-electrode part are electrically connected, and an extension direction of the first sub-electrode part and an extension direction of the second sub-electrode part are different.

Optionally, neighboring instances of the plurality of electrode parts directly contact, and the first sub-electrode part and the second sub-electrode part directly contact; or the electrode layer further includes corner parts, neighboring instances of the plurality of electrode parts are connected by the corner parts, and the first sub-electrode part and the second sub-electrode part are connected by the corner parts.

Optionally, the electrode layer includes a first sub-electrode layer and a second sub-electrode layer, the second sub-electrode layer is provided between the first sub-electrode layer and the first substrate, the first sub-electrode layer includes a plurality of first sub-electrodes arranged in a first direction, and the second sub-electrode layer is provided at a whole surface; and all of the first sub-electrodes extend in the same direction.

Optionally, the electrode layer includes a first sub-electrode layer and a second sub-electrode layer, the second sub-electrode layer is provided between the first sub-electrode layer and the first substrate, the first sub-electrode layer includes a plurality of first sub-electrodes arranged in a first direction, and the second sub-electrode layer is provided at a whole surface; and each of the first sub-electrodes includes the plurality of electrode parts.

Optionally, the electrode layer includes a first sub-electrode layer and a second sub-electrode layer, the second sub-electrode layer is provided between the first sub-electrode layer and the first substrate, the first sub-electrode layer includes a plurality of first sub-electrodes arranged in a first direction, the second sub-electrode layer includes a plurality of second sub-electrodes arranged in the first direction, and orthographic projections of the first sub-electrodes on the first substrate and orthographic projections of the second sub-electrodes on the first substrate are alternately arranged; and all of the first sub-electrodes and all of the second sub-electrodes extend in the same direction.

Optionally, the electrode layer includes a first sub-electrode layer and a second sub-electrode layer, the second sub-electrode layer is provided between the first sub-electrode layer and the first substrate, the first sub-electrode layer includes a plurality of first sub-electrodes arranged in a first direction, the second sub-electrode layer includes a plurality of second sub-electrodes arranged in the first direction, and orthographic projections of the first sub-electrodes on the first substrate and orthographic projections of the second sub-electrodes on the first substrate are alternately arranged; and each of the first sub-electrodes includes the plurality of electrode parts, and each of the second sub-electrodes includes the plurality of electrode parts.

Optionally, the electrode layer includes a third sub-electrode layer, the third sub-electrode layer is provided on one side of the first substrate away from the third polarizing unit, the third sub-electrode layer includes a plurality of third sub-electrodes arranged in a first direction and a plurality of fourth sub-electrodes arranged in the first direction, and the third sub-electrodes and the fourth sub-electrodes are arranged alternately and separately; and all of the third sub-electrodes and all of the fourth sub-electrodes extend in the same direction.

Optionally, the electrode layer includes a third sub-electrode layer, the third sub-electrode layer is provided on one side of the first substrate away from the third polarizing unit, the third sub-electrode layer includes a plurality of third sub-electrodes arranged in a first direction and a plurality of fourth sub-electrodes arranged in the first direction, and the third sub-electrodes and the fourth sub-electrodes are arranged alternately and separately; and each of the third sub-electrodes includes the plurality of electrode parts, and each of the fourth sub-electrodes includes the plurality of electrode parts.

Optionally, an included angle between the absorption axis of the second polarizing unit and the second substrate is 0°, and an included angle between the absorption axis of the third polarizing unit and the first substrate is 90°; or an included angle between the absorption axis of the second polarizing unit and the second substrate is 90°, and an included angle between the absorption axis of the third polarizing unit and the first substrate is 0°.

Optionally, the included angle θ between the absorption axis of the third polarizing unit and the extension direction of the electrode layer satisfies 5-85°.

Optionally, the grating regulating device further includes a plurality of grating units arranged in the first direction, the grating units include the plurality of first sub-electrodes and the plurality of second sub-electrodes, and the grating units are configured to, when the grating regulating device is powered on, be capable to form light transmitting units and light shielding units;

the grating regulating device further includes a plurality of first driving lines and a plurality of second driving lines; and the first sub-electrodes are electrically connected to different instances of the plurality of first driving lines, and the second sub-electrodes are electrically connected to different instances of the plurality of second driving lines.

Optionally, the grating regulating device further includes one or more driving units; and the first driving lines and the second driving lines are electrically connected to at least one of the driving units.

In another aspect, an embodiment of the present application provides a 3D displaying device, where the 3D displaying device includes a display panel and the grating regulating device stated above; and the grating regulating device and the display panel face each other.

Optionally, the 3D displaying device further includes an eyeball tracking module, and the eyeball tracking module is configured to acquire a watching distance.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are merely embodiments of the present application, and a person skilled in the art can obtain other figures according to these figures without paying creative work.

DETAILED DESCRIPTION

Figures 1, 2, 3:
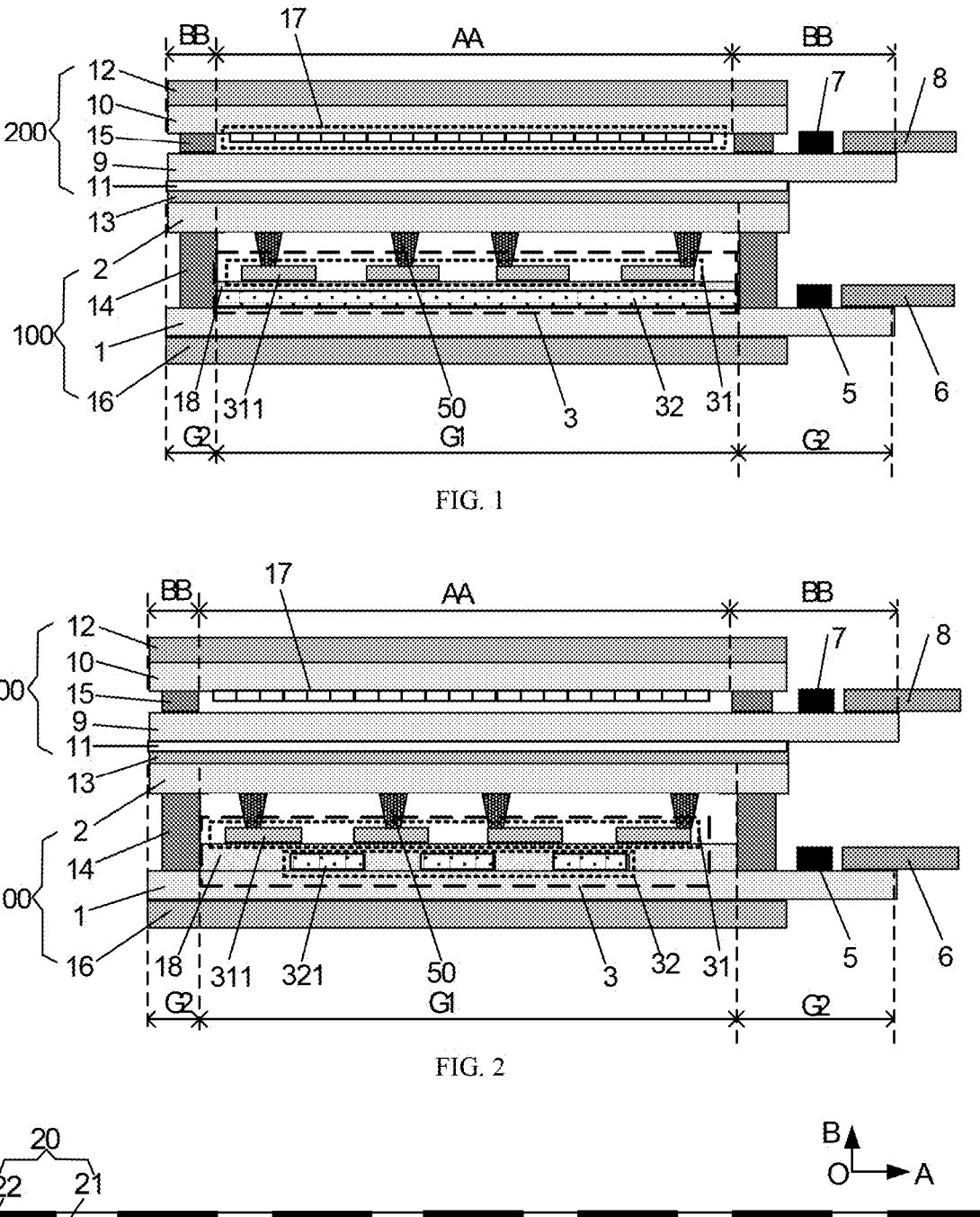
FIG. 1 is a schematic structural diagram of a 3D displaying device according to an embodiment of the present application.
FIG. 2 is a schematic structural diagram of another 3D displaying device according to an embodiment of the present application.
FIG. 3 is a schematic structural diagram of grating units according to an embodiment of the present application.

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the drawings, in order for clarity, the thicknesses of the regions and the layers might be exaggerated. In the drawings, the same reference numbers represent the same or similar components, and therefore the detailed description on them are omitted. Moreover, the drawings are merely schematic illustrations of the present application, and are not necessarily drawn to scale.

In the embodiments of the present application, unless stated otherwise, the meaning of "plurality of" is "two or more". The terms that indicate orientation or position relations, such as "upper", are based on the orientation or position relations shown in the drawings, and are merely for conveniently describing the present application and simplifying the description, rather than indicating or implying that the component or element must have the specific orientation and be constructed and operated according to the specific orientation. Therefore, they should not be construed as a limitation on the present application.

Unless stated otherwise in the context, throughout the description and the claims, the term "comprise" is interpreted as the meaning of opened containing, i.e., "including but not limited to". In the description of the present disclosure, the terms "one embodiment", "some embodiments", "exemplary embodiments", "example", "specific example" or "some examples" are intended to indicate that specific features, structures, materials or characteristics related to the embodiment or example are included in at least one embodiment or example of the present application. The illustrative indication of the above terms does not necessarily refer to the same embodiment or example. Moreover, the specific features, structures, materials or characteristics may be included in any one or more embodiments or examples in any suitable manner.

In the embodiments of the present application, terms such as "first", "second" and "third" are used to distinguish identical items or similar items that have substantially the same functions and effects, merely in order to clearly describe the technical solutions of the embodiments of the present application, and should not be construed as indicating or implying the degrees of importance or implicitly indicating the quantity of the specified technical features.

An embodiment of the present application provides a grating regulating device, where the grating regulating device is applied to a 3D displaying device. Referring to FIGS. 1 and 2, the 3D displaying device includes a display panel 200, the display panel 200 includes a first polarizing unit 12, and the grating regulating device 100 is provided on the side of the display panel 200 away from the first polarizing unit 12. The grating regulating device 100 includes:

a first substrate 1 and a second substrate 2, where the first substrate 1 and the second substrate 2 face each other;

a second polarizing unit 11 provided on the side of the second substrate 2 away from the first substrate 1; and a third polarizing unit 16 provided on the side of the first substrate 1 away from the second substrate 2.

The absorption axis of the first polarizing unit 12 and the absorption axis of the second polarizing unit 11 are perpendicular, and the absorption axis of the second polarizing unit 11 and the absorption axis of the third polarizing unit 16 are perpendicular.

The grating regulating device may include a liquid-crystal grating regulating device, and its type may be a liquid-crystal grating regulating device of the Advanced Super Dimension Switch (ADS) type, the In Plane Switching (IPS) type and the Twisted Nematic (TN) type. If the grating regulating device is an ADS-type or IPS-type liquid-crystal grating regulating device, the light-emission amount after the light rays pass through the grating regulating device may be changed by changing the state of torsion of the liquid-crystal molecules of the liquid-crystal layer located on one side of the electrodes of the same side in the ADS-type or IPS-type liquid-crystal grating regulating device, thereby forming light transmitting units and light shielding units. If the grating regulating device is a TN-type liquid-crystal grating regulating device, the light-emission amount after the light rays pass through the grating regulating device may be changed by changing the state of torsion of the liquid-crystal molecules of the liquid-crystal layer located between the upper and lower electrodes in the TN-type liquid-crystal grating regulating device, thereby forming light transmitting units and light shielding units.

The display panel may be a Liquid Crystal Display (LCD), and the particular type of the display panel is not limited herein.

The grating regulating device is applied to a 3D displaying device. Referring to FIG. 1 and FIG. 2, the 3D displaying device includes a display panel 200 and the grating regulating device 100, and the grating regulating device 100 and the display panel 200 face each other. The grating regulating device may be provided on the light exiting side of the display panel, in which case the grating regulating device may be referred to as a front-placed grating, and the grating regulating device and the display panel share the third polarizing unit. Alternatively, as shown in FIG. 1 and FIG. 2, the grating regulating device 100 may be provided on the shadow side of the display panel 200, in which case the grating regulating device 100 may be referred to as a rear-placed grating, and the grating regulating device 100 and the display panel 200 share the second polarizing unit 11, which is not limited herein.

All of the materials and the types of the first polarizing unit, the second polarizing unit and the third polarizing unit are not particularly limited. As an example, all of the materials of the first polarizing unit, the second polarizing unit and the third polarizing unit may include polyvinyl alcohol (PVA) and polyvinyl chloride (PVC). All of the types of the first polarizing unit, the second polarizing unit and the third polarizing unit may include a linear polarizer and a grating.

Both of the materials of the first substrate and the second substrate are not particularly limited herein. As an example, both of the materials of the first substrate and the second substrate may include glass and polyimide (PI).

The absorption axis of the first polarizing unit and the absorption axis of the second polarizing unit are perpendicular, and the absorption axis of the second polarizing unit and the absorption axis of the third polarizing unit are perpendicular. The particular angles of the absorption axes of the polarizing units are not limited herein. As an example, the included angle between the absorption axis of the first polarizing unit and the display panel may be 45°/135° or 0°/90°, in which case the included angle between the absorption axis of the second polarizing unit and the second substrate may be 135°: 45° or 90°/0°, and therefore the included angle between the absorption axis of the third polarizing unit and the first substrate may be 45°/135° or 0°/90°, whereby the angle of the absorption axis of the first polarizing unit and the angle of the absorption axis of the second polarizing unit match, and the angle of the absorption axis of the second polarizing unit and the angle of the absorption axis of the third polarizing unit match.

Referring to FIG. 3, the grating regulating device includes a plurality of grating units arranged in a first direction (the direction OA shown in FIG. 3). When the grating regulating device is powered on, the grating units 20 can form light transmitting units 21 and light shielding units 22. The light transmitting units can transmit light rays (which are equivalent to the openings of the grating units), and the light shielding units cannot transmit light. The plurality of grating units cooperate to finally form a grating having a plurality of openings. The aperture ratio of the grating units is the area of the light transmitting units/(the area of the light transmitting units plus the area of the light shielding units).

Figure 4:
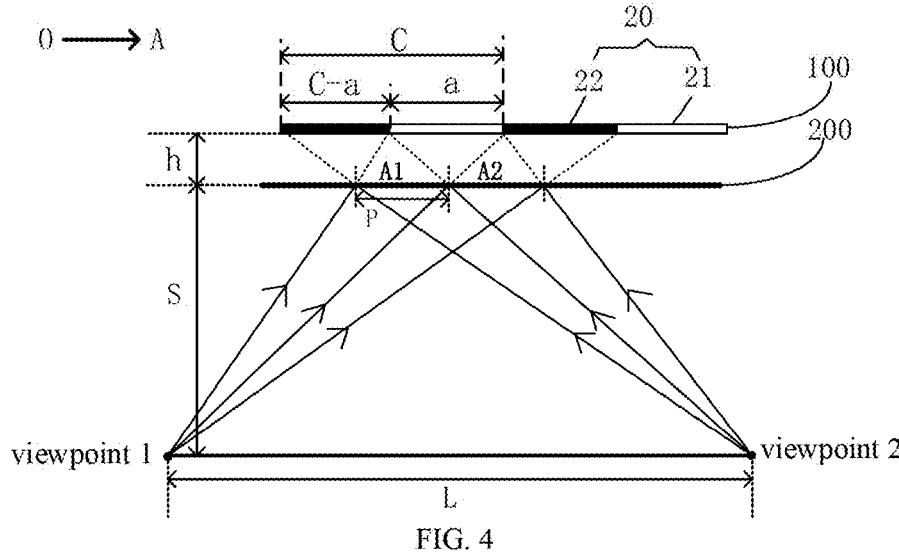
FIG. 4 is a principle diagram of realizing 3D displaying according to an embodiment of the present application.

The principle of realizing the 3D displaying will be described below by taking the case as an example in which the grating regulating device is provided on the shadow side of the display panel. Referring to FIG. 4, the positions of the left eye and the right eye of the user are marked as the viewpoint 1 and the viewpoint 2 respectively (in other words, the viewpoint quantity n is 2), the distance between the two eyes is the interpupillary distance L, the initial watching distance (i.e., the distance between the eyes and the display panel) is marked as S, the distance between the display panel 200 and the grating regulating device 100 is the placement height h, the width in the first direction (the direction OA) of a single pixel unit in the display panel 200 is P, and the width in the first direction (the direction OA) of one grating unit 20 in the grating regulating device 100 is C (which is also referred to as Pitch C), where the width in the first direction (the direction OA) of the light transmitting unit 21 is a, and the width in the first direction (the direction OA) of the light shielding unit 22 is C−a. It should be noted that the display panel includes a plurality of pixel units arranged in an array, and each of the pixel units may include a plurality of sub-pixels, for example, a red-color (R) sub-pixel, a green-color (G) sub-pixel or a blue-color (B) sub-pixel.

In FIG. 4, by controlling the opening size and the opening position of the grating units, as a result, the viewpoint 1, when watching a first displaying region A1 of the display panel, corresponds to the light transmitting unit 21, while the viewpoint 2, when watching the first displaying region A1 of the display panel, corresponds to the light shielding unit 22. In other words, at the same observation moment, the viewpoint 1 can see the first displaying region A1, but the viewpoint 2 cannot see the first displaying region A1. Likewise, it may also be optional that, by controlling the opening size and the opening position of the grating units, at the same observation moment, the viewpoint 2 can see a second displaying region A2, but the viewpoint 1 cannot see the second displaying region A2. Accordingly, the image of the first displaying region A1 seen by the viewpoint 1 and the image of the second displaying region A2 seen by the viewpoint 2 can have a parallax, thereby forming stereoscopic vision, to realize the 3D displaying.

Referring to FIG. 4, according to the geometrical relation of a triangle, it can be obtained that:

$$h/(h + S) = P/L \tag{1}$$

$$C/nP = (S + h)/S \tag{2}$$

$$a/P = (S + h)/S \tag{3}$$

By using the formulas (1), (2) and (3), it can be obtained that c=nPL/(L−P) (4), h=SP/(L−P) (5) and a/C=1/n (6), where the viewpoint quantity n may be 2. The width C in the first direction and the placement height h of the grating unit in the grating regulating device may be determined with reference to the formulas (4) and (5) respectively. In the formula (6), when the viewpoint quantity n is 2, in the grating unit, the width in the first direction of the light transmitting unit and the width in the first direction of the light shielding unit are equal.

Figure 5:
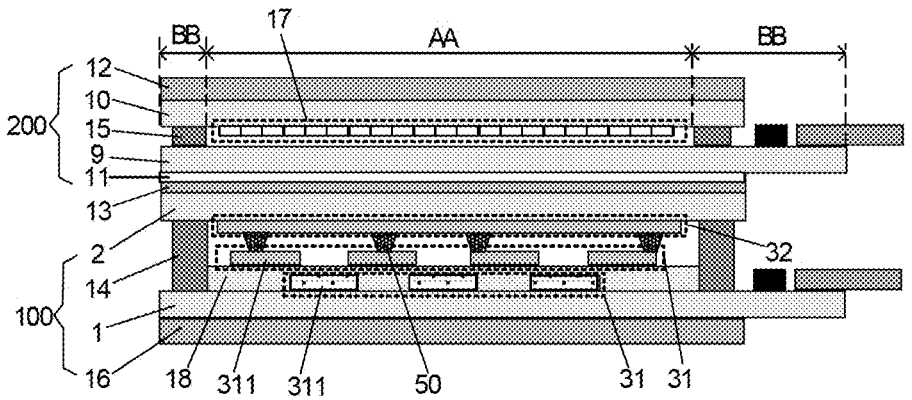
FIG. 5 is a schematic structural diagram of a TN-type 3D displaying device in the related art.
Figure 6:
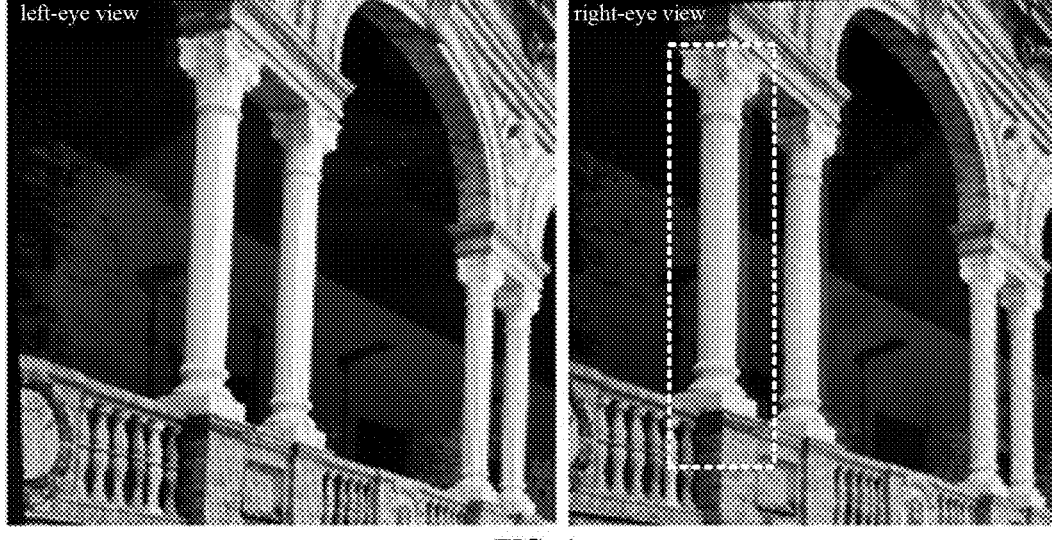
FIG. 6 is a product effect diagram of a 3D displaying device according to an embodiment of the present application.

In the related art, in practical applications of 3D displaying devices, usually a TN-type grating regulating device is used, as shown in FIG. 5. However, currently, after the practical TN-type grating regulating devices are produced, it is found by test that the problem of 3D ghosting shown by the dotted-line block in FIG. 6 frequently exists. Referring to FIG. 6, when the user is at the optimum viewpoint position, the left-eye view is normal, while the right-eye view has ghosting at the dotted-line block. Moreover, when the human eyes are moving leftwardly and rightwardly, if the deflection angle is larger, the ghosting is more serious.

The above-described imperfect will be analyzed with reference to FIG. 4. Referring to FIG. 4, in the normal watching of the 3D displaying device, it is controlled by using the grating regulating device that the light transmitting unit 21 transmits light and the light shielding unit 22 does not transmit light, whereby the left eye and the right eye individually can merely see left and right views having a certain parallax, thereby generating the 3D effect. However, if in FIG. 4 the light shielding unit 22 of the grating regulating device is not black enough and has light leakage, then the right eye, besides seeing the view seen by itself, can also see the left-eye view of a certain brightness, thereby resulting in the problem of ghosting. In other words, in the TN electronic grating technique in the related art, because the TN-type grating regulating devices have a serious large-visual-angle light leakage, when the user is watching the 3D displaying device at a large visual angle, a serious problem of ghosting happens, which results in bad sensations of the user such as nausea and dizziness.

Figure 7:
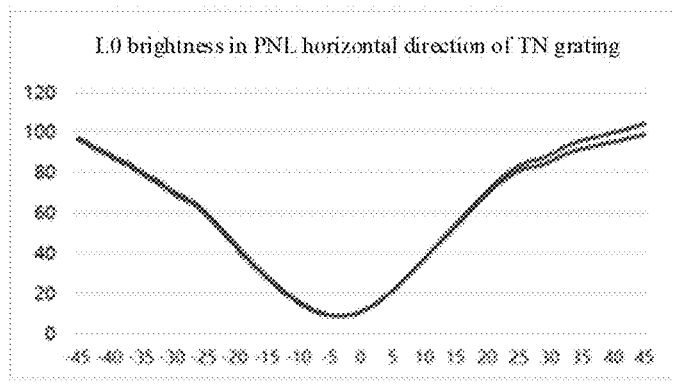
FIG. 7 is a diagram of the variation of the L0 brightness in the horizontal direction of a TN-type grating regulating device in the related art.
Figure 8:
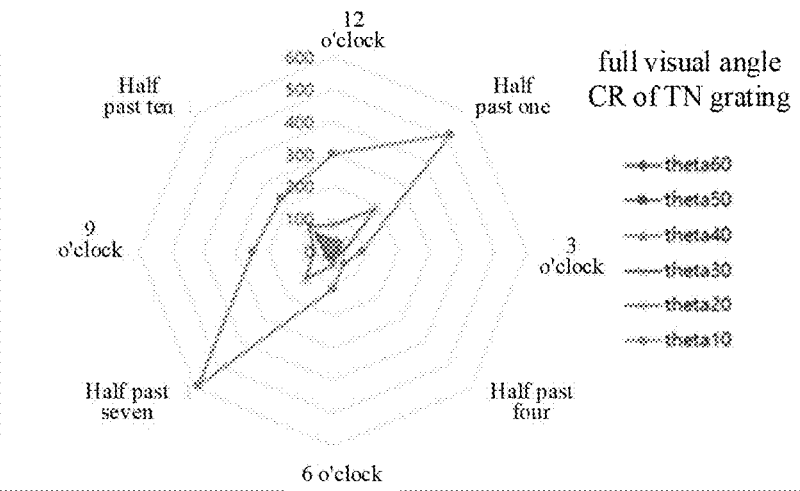
FIG. 8 is a full-visual-angle CR diagram of a TN-type grating regulating device in the related art.

Optical tests will be performed to the TN-type grating regulating device below. FIG. 7 is a diagram of the variation of the L0 brightness of the TN-type grating regulating device at the horizontal visual angles from −45° to 0° and from 0° to 45°. FIG. 8 is a full-visual-angle CR diagram of the TN-type grating regulating device. Referring to FIG. 7, both of the L0 brightnesses at the horizontal visual angles from 0° to −45° and from 0° to 45° sharply increase, which indicates that the black stripe in FIG. 4 is not black enough and has light transmission, which results in the problem of ghosting. Additionally, referring to FIG. 8, in FIG. 8 the TN-type grating regulating device is in the full visual angle at the horizontal visual angles of 10°, 20° and 30°, and all of the directions with the good visual angle are the direction of obliquely 45°. That is because the directions of the absorption axis of the upper polarizer and the absorption axis of the lower polarizer of conventional TN-type grating regulating devices are 45°/135°, in which case the optimum visual angle is in the horizontal direction. However, after the TN-type grating regulating device and the display panel are adhered together to form the 3D displaying device shown in FIG. 5, the TN-type grating regulating device 100 and the display panel 200 share the second polarizing unit 11. In this case, because the display panel 200 commonly used in the related art is an ADS-type display panel, and the directions of the absorption axis of the upper polarizer and the absorption axis of the lower polarizer of the ADS-type display panel are 0°/90°, which does not match with 45°/135°, the direction of the optimum visual angle changes from the horizontal direction into the direction of obliquely 45°, which causes that the 3D image has the problem of ghosting, thereby greatly deteriorating the user experience, and seriously restricting the promotion of 3D displaying devices.

Figure 9:
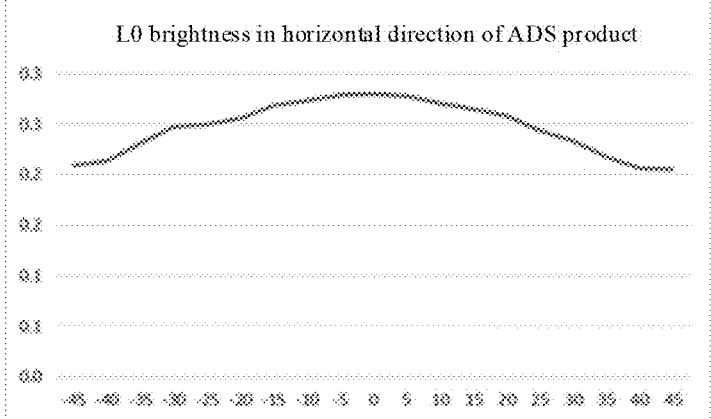
FIG. 9 is a diagram of the variation of the L0 brightness in the horizontal direction of an ADS-type grating regulating device according to an embodiment of the present application.
Figure 10:
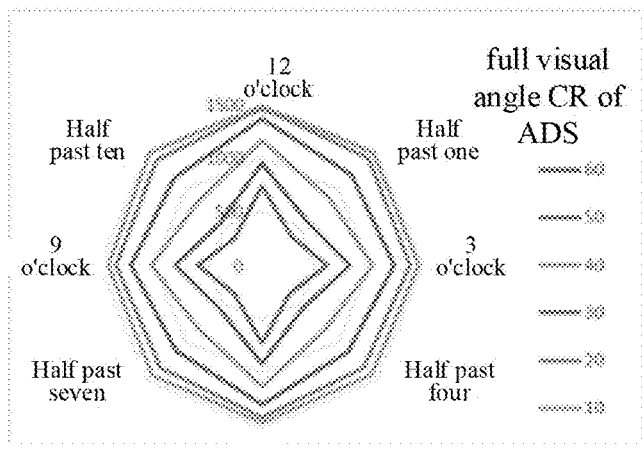
FIG. 10 is a full-visual-angle CR diagram of an ADS-type grating regulating device according to an embodiment of the present application.

In order to solve the above problem, in the 3D displaying device according to the embodiments of the present application, it is configured that the absorption axis of the first polarizing unit and the absorption axis of the second polarizing unit are perpendicular, and the absorption axis of the second polarizing unit and the absorption axis of the third polarizing unit are perpendicular. For example, when the direction of the absorption axis of the first polarizing unit is 0°, the direction of the absorption axis of the second polarizing unit is 90°, in which case the direction of the absorption axis of the third polarizing unit of the grating regulating device is 0°. In other words, the display panel is an ADS-type display panel, and the grating regulating device is an ADS-type grating regulating device. Accordingly, the direction of the absorption axis of the display panel and the direction of the absorption axes of the grating regulating device match, and both of the horizontal visual angle of the grating regulating device and the horizontal visual angle of the display panel are good, thereby greatly alleviating or even eliminating the problem of ghosting of 3D displaying devices, and obtaining a good user experience. FIG. 9 is a diagram of the variation of the L0 brightness of the ADS-type grating regulating device at the horizontal visual angles from –45° to 0° and from 0° to 45°. FIG. 10 is a full-visual-angle CR diagram of the ADS-type grating regulating device. Referring to FIG. 9, both of the L0 brightnesses at the horizontal visual angles from 0° to –45° and from 0° to 45° slowly decrease, which indicates that the black stripe in FIG. 4 is black enough, and there is hardly the problem of ghosting. Additionally, referring to FIG. 10, the ADS-type grating regulating device is in the full visual angle at the horizontal visual angle of 10-60°, and all of the directions with the good visual angle of the angles are the horizontal direction.

Optionally, referring to FIG. 1 and FIG. 2, the grating regulating device 100 further includes an electrode layer 3, and the electrode layer 3 is provided on the side of the first substrate 1 away from the third polarizing unit 16.

Referring to FIG. 11 to FIG. 17, the included angle θ between the absorption axis of the third polarizing unit and the extension direction of the electrode layer satisfies 0°<θ<180°, and θ≠90°. Because the direction of the absorption axis of the polarizing unit is the same as the alignment direction (rubbing direction) of the alignment layer in the 3D displaying device, the liquid crystal having the initial alignment can be deflected when powered on, to realize a better effect of 3D displaying, and alleviate or even eliminate the problem of ghosting of 3D displaying devices to the greatest extent.

Both of the material and the structure of the electrode layer are not particularly limited herein. As an example, in order to increase the light-emission amount of the grating regulating device, the material of the electrode layer may include a transparent electrically conductive material, for example, Indium Tin Oxide (ITO). As an example, the electrode layer may include a single-layer structure. Alternatively, the electrode layer may include a multi-layer structure. The particular structure of the electrode layer may be determined according to the type of the grating regulating device.

The particular numerical value of the included angle θ between the absorption axis of the third polarizing unit and the extension direction of the electrode layer is not limited herein. As an example, the included angle θ between the absorption axis of the third polarizing unit and the extension direction of the electrode layer may be 5°, 20°, 35°, 56°, 85° and so on.

Figure 11:
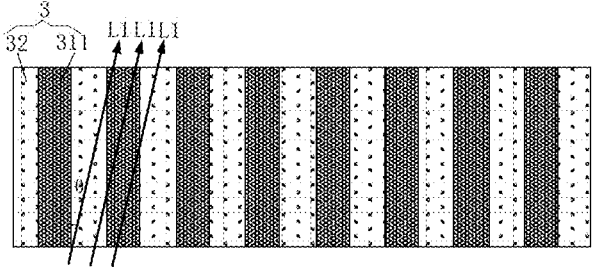
FIG. 11 is a schematic structural diagram of a first type of the first sub-electrode layer and the second sub-electrode layer according to an embodiment of the present application.

Optionally, referring to FIG. 11, the extension direction of the electrode layer 3 is parallel to the first substrate. Accordingly, by configuring the direction of the absorption axis of the third polarizing unit and the extension direction of the electrode layer to have an included angle θ therebetween, the present application can realize the initial alignment of the liquid crystal, and alleviate or even eliminate the problem of ghosting of 3D displaying devices to the greatest extent.

It should be noted that FIG. 11 illustrates by taking the case as an example in which the electrode layer 3 includes a first electrode layer 31 and a second electrode layer 32 shown in FIG. 1, in which case the second electrode layer 32 is provided at the whole surface, and all of the first sub-electrodes 311 in the first electrode layer 31 are provided in the direction parallel to the first substrate. Certainly, the electrode layer 3 may also include the first electrode layer 31 and the second electrode layer 32 shown in FIG. 2, in which case the second electrode layer includes a plurality of discrete slit electrodes 321.

Alternatively, referring to FIG. 12 to FIG. 17, the absorption axis L1 of the third polarizing unit is parallel to the first substrate. Accordingly, by configuring the extension direction of the electrode layer and the direction of the absorption axis of the third polarizing unit to have an included angle θ therebetween, the present application can realize the initial alignment of the liquid crystal, and alleviate or even eliminate the problem of ghosting of 3D displaying devices to the greatest extent.

Figure 12:
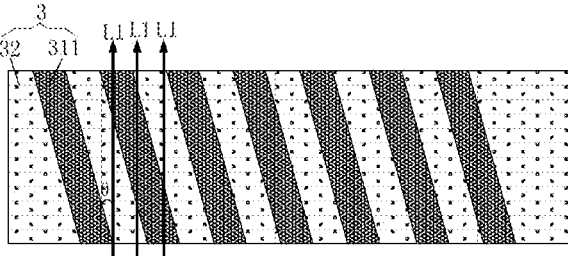
FIG. 12 is a schematic structural diagram of a second type of the first sub-electrode layer and the second sub-electrode layer according to an embodiment of the present application.
Figure 13:
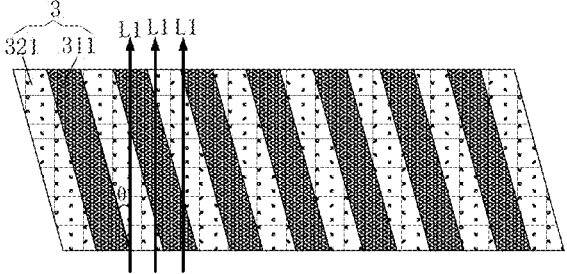
FIG. 13 is a schematic structural diagram of a third type of the first sub-electrode layer and the second sub-electrode layer according to an embodiment of the present application.

Optionally, referring to FIG. 12 and FIG. 13, if the absorption axis L1 of the third polarizing unit is parallel to the first substrate, the electrode layer 3 extends in a same direction. That facilitates to fabricate the electrode layer, to be simply and easily implemented.

FIG. 12 illustrates by taking the case as an example in which the electrode layer 3 includes the first electrode layer 31 and the second electrode layer 32 shown in FIG. 1, in which case the second electrode layer 32 is provided at the whole surface, and all of the first sub-electrodes 311 in the first electrode layer 31 extend in the same direction (the direction having the angle θ with the absorption axis L1 of the third polarizing unit shown in FIG. 12).

FIG. 13 illustrates by taking the case as an example in which the electrode layer 3 includes the first electrode layer 31 and the second electrode layer 32 shown in FIG. 2, in which case the second electrode layer 32 includes a plurality of discrete slit electrodes 321, and all of the first sub-electrodes 311 in the first electrode layer 31 and all of the second sub-electrodes 321 in the second electrode layer 32 extend in the same direction (the direction having the angle θ with the absorption axis L1 of the third polarizing unit shown in FIG. 12).

Optionally, referring to FIG. 14 to FIG. 17, if the absorption axis L1 of the third polarizing unit is parallel to the first substrate, the electrode layer 3 includes a plurality of electrode parts 33, and the neighboring electrode parts 33 are electrically connected. Each of the electrode parts 33 includes a first sub-electrode part 331 and a second sub-electrode part 332, the first sub-electrode part 331 and the second sub-electrode part 332 are electrically connected, and the extension direction of the first sub-electrode part 331 and the extension direction of the second sub-electrode part 332 are different. Accordingly, the electrode layer can occupy a smaller room, to realize miniaturization of the 3D displaying device.

The shape of the electrode parts is not particularly limited herein. As an example, the shape of the orthographic projections of the electrode parts on the first substrate may be rectangular, rhombic and so on.

The particular mode of the electric connection between the neighboring electrode parts is not limited herein. As an example, the neighboring electrode parts may directly contact. Alternatively, the neighboring electrode parts may be electrically connected by other components.

The first sub-electrode part and the second sub-electrode part are not particularly limited herein. As an example, all of the shapes and the areas of the first sub-electrode part and the second sub-electrode part may be the same. Alternatively, the shapes and the areas of the first sub-electrode part and the second sub-electrode part may be different.

The particular mode of the electric connection between the first sub-electrode part and the second sub-electrode part is not limited herein. As an example, the first sub-electrode part and the second sub-electrode part may directly contact. Alternatively, the first sub-electrode part and the second sub-electrode part may be electrically connected by other components.

Figure 14:
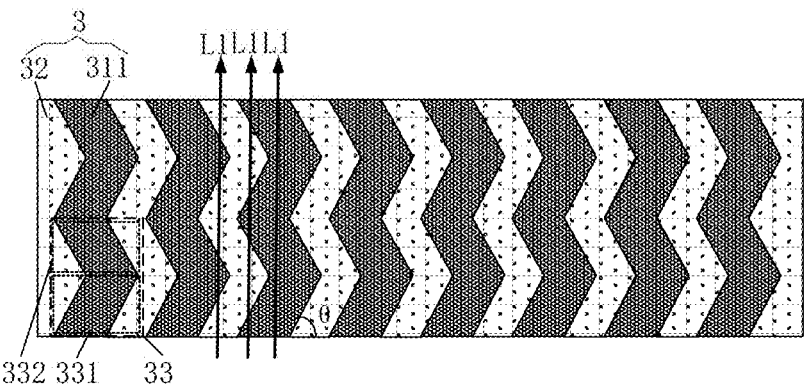
FIG. 14 is a schematic structural diagram of a fourth type of the first sub-electrode layer and the second sub-electrode layer according to an embodiment of the present application.
Figure 15:
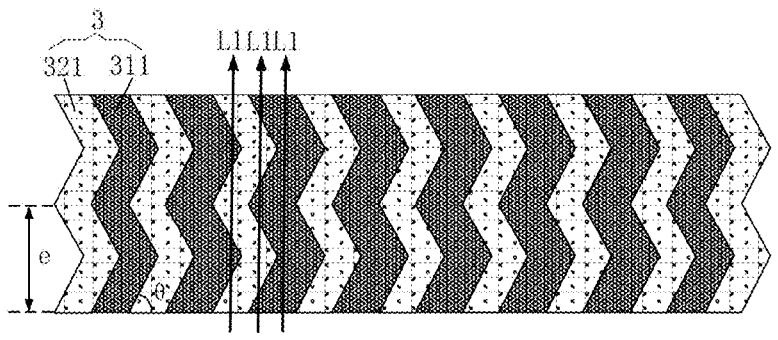
FIG. 15 is a schematic structural diagram of a fifth type of the first sub-electrode layer and the second sub-electrode layer according to an embodiment of the present application.

Optionally, referring to FIG. 14 and FIG. 15, the neighboring electrode parts 33 directly contact, and the first sub-electrode part 331 and the second sub-electrode part 332 directly contact.

Figure 16:
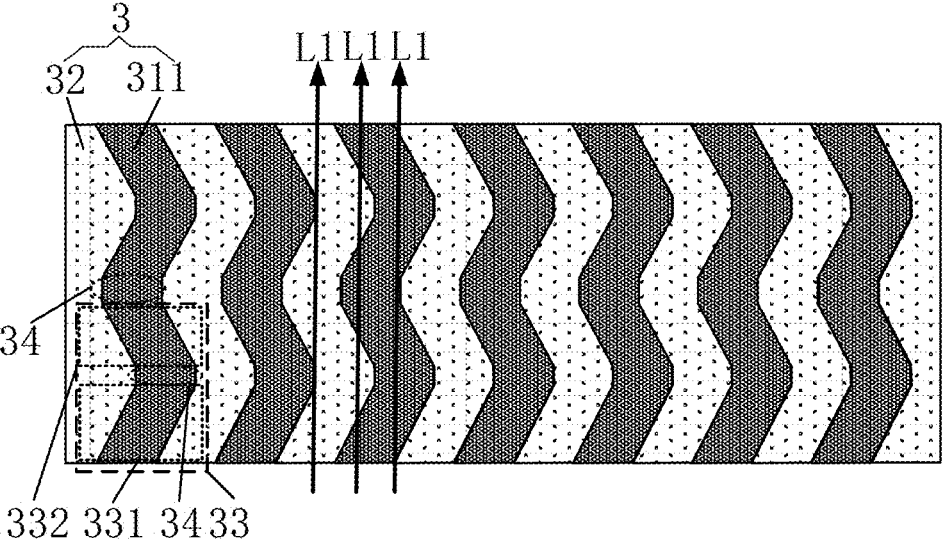
FIG. 16 is a schematic structural diagram of a sixth type of the first sub-electrode layer and the second sub-electrode layer according to an embodiment of the present application.
Figure 17:
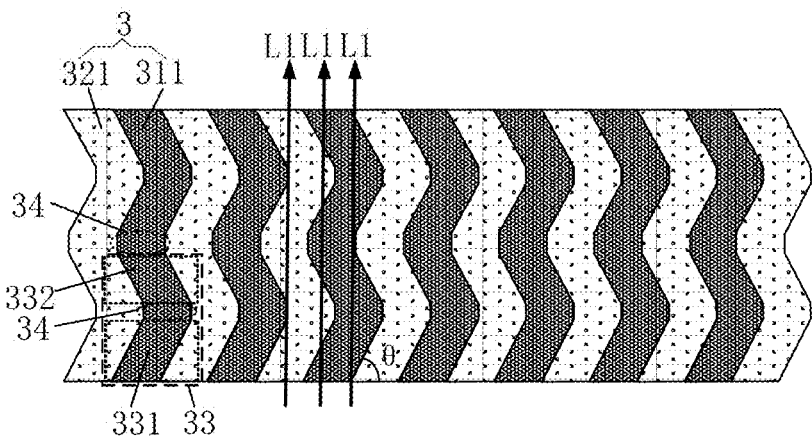
FIG. 17 is a schematic structural diagram of a seventh type of the first sub-electrode layer and the second sub-electrode layer according to an embodiment of the present application.

Alternatively, referring to FIG. 16 and FIG. 17, the electrode layer further includes corner parts 34, the neighboring electrode parts 33 are connected by the corner parts 34, and the first sub-electrode part 331 and the second sub-electrode part 332 are connected by the corner parts 34.

Both of the material and the shape of the corner parts are not particularly limited herein. As an example, the material of the corner parts may include a metal and so on, which may be particularly determined according to the material of the electrode layer. As an example, the shape of the orthographic projections of the corner parts on the first substrate may include a straight line, an arc and so on.

It should be noted that, in FIG. 15 e represents the width of the electrode parts in a second direction (the direction OB shown in FIG. 3). According to the practical process capacity, the value of e may range from tens of micrometers to hundreds of micrometers.

Optionally, referring to FIG. 1, the electrode layer 3 includes a first sub-electrode layer 31 and a second sub-electrode layer 32, the second sub-electrode layer 32 is provided between the first sub-electrode layer 31 and the first substrate 1, the first sub-electrode layer 31 includes a plurality of first sub-electrodes 311 arranged in the first direction, and the second sub-electrode layer 32 is provided at the whole surface.

Referring to FIG. 11 to FIG. 13, all of the first sub-electrodes extend in the same direction. Accordingly, by configuring the extension direction of the first sub-electrodes and the direction of the absorption axis of the third polarizing unit to have an included angle θ therebetween, the present application can realize the initial alignment of the liquid crystal, and alleviate or even eliminate the problem of ghosting of 3D displaying devices to the greatest extent.

The extension direction of all of the first sub-electrodes is not particularly limited herein. As an example, referring to FIG. 11, the extension direction of all of the first sub-electrodes is parallel to the first substrate. Alternatively, referring to FIG. 12 and FIG. 13, the absorption axis L1 of the third polarizing unit is parallel to the first substrate, and the extension direction of all of the first sub-electrodes and the absorption axis L1 of the third polarizing unit have an included angle θ therebetween.

Optionally, referring to FIG. 1, the electrode layer 3 includes a first sub-electrode layer 31 and a second sub-electrode layer 32, the second sub-electrode layer 32 is provided between the first sub-electrode layer 31 and the first substrate 1, the first sub-electrode layer 31 includes a plurality of first sub-electrodes 311 arranged in the first direction, and the second sub-electrode layer 32 is provided at the whole surface.

Referring to FIG. 14 and FIG. 16, each of the first sub-electrodes 311 includes a plurality of electrode parts. Accordingly, the first sub-electrodes can occupy a smaller room, to realize miniaturization of the 3D displaying device.

Optionally, referring to FIG. 2, the electrode layer 3 includes a first sub-electrode layer 31 and a second sub-electrode layer 32, the second sub-electrode layer 32 is provided between the first sub-electrode layer 31 and the first substrate 1, the first sub-electrode layer 31 includes a plurality of first sub-electrodes 311 arranged in the first direction, the second sub-electrode layer 32 includes a plurality of second sub-electrodes 321 arranged in the first direction, and the orthographic projections of the first sub-electrodes 311 on the first substrate 1 and the orthographic projections of the second sub-electrodes 321 on the first substrate 1 are alternately arranged.

Referring to FIG. 13, all of the first sub-electrodes 311 and all of the second sub-electrodes 321 extend in the same direction. Accordingly, all of the first sub-electrodes and the second sub-electrodes can be easily fabricated, to be simply and easily implemented.

Optionally, referring to FIG. 2, the electrode layer 3 includes a first sub-electrode layer 31 and a second sub-electrode layer 32, the second sub-electrode layer 32 is provided between the first sub-electrode layer 31 and the first substrate 1, the first sub-electrode layer 31 includes a plurality of first sub-electrodes 311 arranged in the first direction, the second sub-electrode layer 32 includes a plurality of second sub-electrodes 321 arranged in the first direction, and the orthographic projections of the first sub-electrodes 311 on the first substrate 1 and the orthographic projections of the second sub-electrodes 321 on the first substrate 1 are alternately arranged.

Referring to FIG. 15 and FIG. 17, each of the first sub-electrodes includes a plurality of electrode parts, and each of the second sub-electrodes includes a plurality of electrode parts. Accordingly, the first sub-electrodes and the second sub-electrodes can occupy a smaller room, to realize miniaturization of the 3D displaying device.

Figure 18:
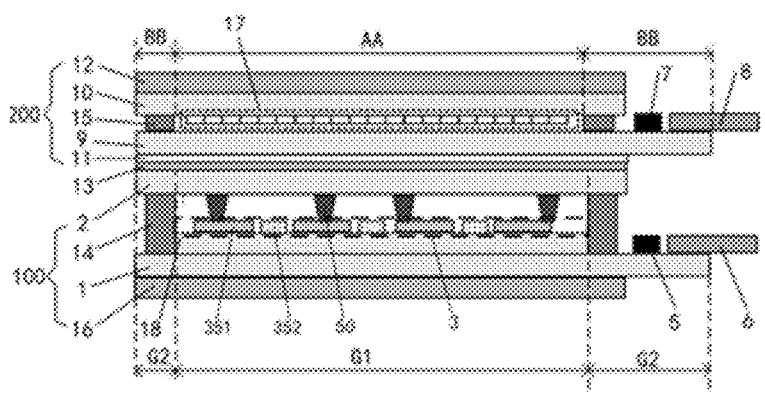
FIG. 18 is a schematic structural diagram of yet another 3D displaying device according to an embodiment of the present application.

Optionally, referring to FIG. 18, the electrode layer 3 includes a third sub-electrode layer, the third sub-electrode layer is provided on the side of the first substrate 1 away from the third polarizing unit 16, the third sub-electrode layer includes a plurality of third sub-electrodes 351 arranged in the first direction and a plurality of fourth sub-electrodes 352 arranged in the first direction, and the third sub-electrodes 351 and the fourth sub-electrodes 352 are arranged alternately and separately.

All of the third sub-electrodes and all of the fourth sub-electrodes extend in the same direction. Accordingly, the third sub-electrodes and the fourth sub-electrodes can be easily fabricated, to be simply and easily implemented.

Optionally, referring to FIG. 18, the electrode layer 3 includes a third sub-electrode layer, the third sub-electrode layer is provided on the side of the first substrate 1 away from the third polarizing unit 16, the third sub-electrode layer includes a plurality of third sub-electrodes 351 arranged in the first direction and a plurality of fourth sub-electrodes 352 arranged in the first direction, and the third sub-electrodes 351 and the fourth sub-electrodes 352 are arranged alternately and separately.

Referring to FIG. 15 and FIG. 17, each of the third sub-electrodes includes a plurality of electrode parts, and each of the fourth sub-electrodes includes a plurality of electrode parts. Accordingly, the third sub-electrodes and the fourth sub-electrodes can occupy a smaller room, to realize miniaturization of the 3D displaying device.

Optionally, the included angle between the absorption axis of the second polarizing unit and the second substrate is 0°, and the included angle between the absorption axis of the third polarizing unit and the first substrate is 90°; or the included angle between the absorption axis of the second polarizing unit and the second substrate is 90°, and the included angle between the absorption axis of the third polarizing unit and the first substrate is 0°. Accordingly, the display panel is an ADS-type display panel, and the grating regulating device is an ADS-type grating regulating device, which can better alleviate or even eliminate ghosting, to improve the user experience.

Optionally, the included angle θ between the absorption axis of the third polarizing unit and the extension direction of the electrode layer satisfies 5°-85°.

The particular numerical value of the included angle θ between the absorption axis of the third polarizing unit and the extension direction of the electrode layer is not limited herein. As an example, the included angle θ between the absorption axis of the third polarizing unit and the extension direction of the electrode layer may be 5°, 15°, 36°, 53°, 70°, 85° and so on.

How to control the grating regulating device will be described below by taking the case as an example in which the first sub-electrode layer 31 includes a plurality of first sub-electrodes 311 and the second sub-electrode layer 32 includes a plurality of second sub-electrodes 321, as shown in FIG. 2. Optionally, referring to FIG. 2 and FIG. 3, the grating regulating device 100 further includes a plurality of grating units 20 arranged in the first direction, the grating units 20 include a plurality of first sub-electrodes 311 and a plurality of second sub-electrodes 321, and the grating units 20 are configured to, when the grating regulating device 100 is powered on, be capable to form light transmitting units 21 and light shielding units 22.

Figure 19:
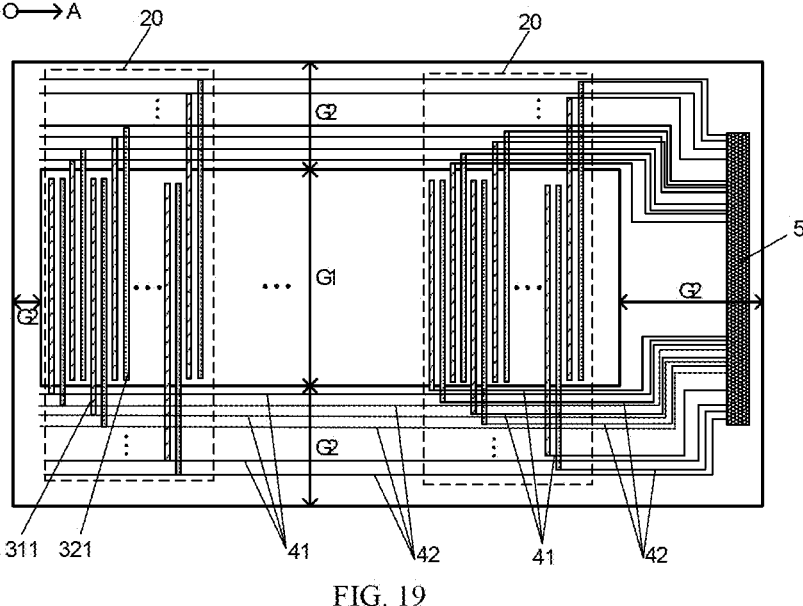
FIG. 19 is a schematic structural diagram of a grating regulating device according to an embodiment of the present application.

Referring to FIG. 19, the grating regulating device further includes a plurality of first driving lines 41 and a plurality of second driving lines 42. The first sub-electrodes 311 are electrically connected to different first driving lines 41, and the second sub-electrodes 321 are electrically connected to different second driving lines 42.

Figure 20:
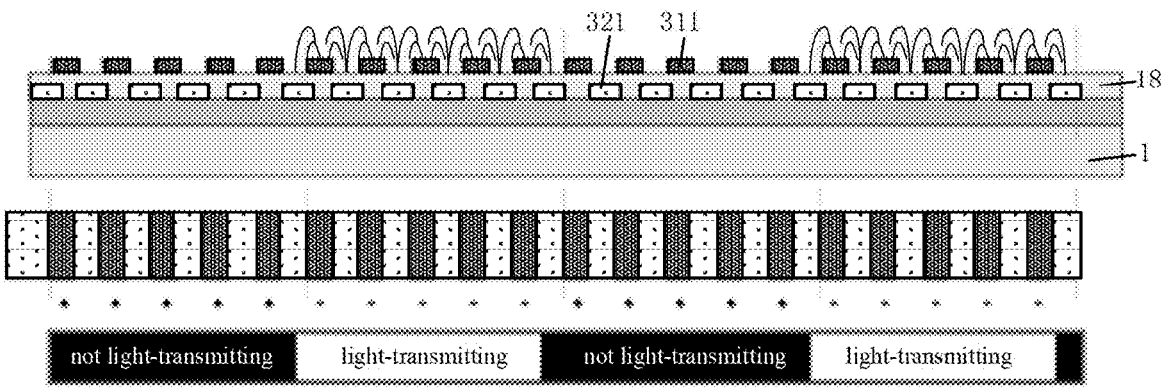
FIG. 20 is a principle diagram of an electric field according to an embodiment of the present application.

The naked-eye-3D technique has mainly two types, the reproduced-binocular-parallax technique and the original-optical-field technique. The main principle of the repro-duced-binocular-parallax technique is to cause the left eye and the right eye of the user to receive two images having a parallax, where the two images are fused into a 3D image in the brain of the user. Based on that, the display panel may be treated, to map the images having a parallax to the left eye and the right eye of the user, thereby generating the 3D image. The electronic grating is one of the reproduced-binocular-parallax naked-eye-3D techniques. For example, referring to FIG. 1 and FIG. 2, the technique uses a 2D display panel in cooperation with an ADS-type liquid-crystal grating regulating device to realize the 3D effect, where the ADS-type liquid-crystal grating regulating device uses a two-layer electrode (i.e., the first sub-electrode layer and the second sub-electrode layer), and, by generating an electric field between the first sub-electrode layer and the second sub-electrode layer, drives the liquid crystal to deflect, to control the different regions to transmit light or not to transmit light, as shown in FIG. 20 (in this case, when the voltages applied to the first sub-electrodes 311 and the second sub-electrodes 312 are equal, the first sub-electrodes 311 and the second sub-electrodes 312 do not generate an electric field and the regions do not transmit light, when the voltages applied to the first sub-electrodes 311 and the second sub-electrodes 312 are unequal, the first sub-elec-trodes 311 and the second sub-electrodes 312 generate an electric field and the regions transmits light), thereby real-izing that the left eye and the right eye of the user receive different images, to realize the effect of 3D displaying. Alternatively, as shown in FIG. 18, the technique uses a 2D display panel in cooperation with an IPS-type liquid-crystal grating regulating device to realize the 3D effect, where the IPS-type liquid-crystal grating regulating device uses a monolayer electrode (i.e., a third sub-electrode layer and a fourth sub-electrode layer), and, by generating an electric field between the third sub-electrode layer and the fourth sub-electrode layer, drives the liquid crystal to deflect, to control the different regions to transmit light or not to transmit light, thereby realizing that the left eye and the right eye of the user receive different images, to realize the effect of 3D displaying.

Figure 21:
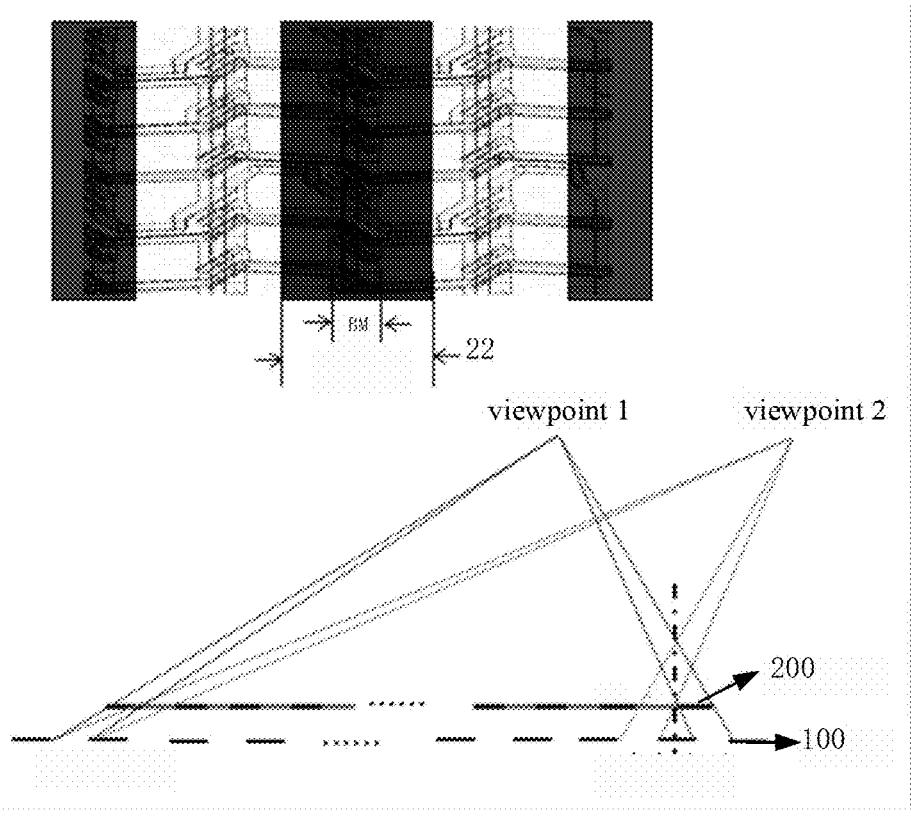
FIG. 21 is a schematic structural diagram of the coinciding between the center lines of the BM of the display panel and the light shielding unit of the grating regulating device according to an embodiment of the present application.

On that basis, referring to FIG. 21, when the viewpoints of the user are at the initial watching distance (the optimum watching distance), the center of the black matrix (BM) of the display panel coincides with the center of the light shielding unit of the TN-type liquid-crystal grating regulat-ing device, where L is the center line of the light shielding unit and the BM.

The orthographic projections of the first sub-electrodes on the first substrate and the orthographic projections of the second sub-electrodes on the first substrate are alternately arranged, and the orthographic projections of the first sub-electrodes on the first substrate and the orthographic pro-jections of the second sub-electrodes on the first substrate may partially overlap, or not overlap, which is not limited herein. As restrained by the relevant process, the boundaries of the first sub-electrodes and the boundaries of the second sub-electrodes partially overlap in the direction perpendicu-lar to the first substrate, so the orthographic projections of the first sub-electrodes on the first substrate and the ortho-graphic projections of the second sub-electrodes on the first substrate partially overlap.

Taking the structure shown in FIG. 2 as an example for the description, the parts of the first sub-electrodes 311 that overlap with the second sub-electrodes 321 in the direction perpendicular to the first substrate 1 are silent electrodes, are shielded by the second sub-electrodes 321, and have no action on the liquid crystal. The parts of the first sub-electrodes 311 that do not overlap with the second sub-electrodes 321 in the direction perpendicular to the first substrate 1 are active electrodes, and can control the liquid crystal to rotate. The first sub-electrodes 311 are closer to the liquid-crystal layer than the second sub-electrodes 321, and are not influenced by the second sub-electrodes 321. Therefore, all of the first sub-electrodes are active electrodes, and can control the liquid crystal to rotate. In FIG. 2, in order to prevent mutual influence between the first sub-electrodes 311 and the second sub-electrodes 321, the grating regulating device may further include an insulating layer 18.

The shapes of the first sub-electrodes and the second sub-electrodes are not limited. As an example, the shapes of the first sub-electrodes and the second sub-electrodes may include the strip shape shown in FIG. 19, and the shapes of their cross-sections may include a rectangle, a square, a regular trapezoid, an inversed trapezoid and so on. All of FIG. 1, FIG. 2 and FIG. 18 illustrate by taking the case as an example in which the cross-sections of the first sub-electrodes and the second sub-electrodes are a rectangle.

Optionally, the grating regulating device further includes one or more driving units; and the first driving lines and the second driving lines are electrically connected to at least one of the driving units.

The particular quantity of the driving units is not limited herein. As an example, the device may, as shown in FIG. 19, include one driving unit 5, or may include a plurality of driving units. The driving unit may include a driving chip (IC), and the driving chip may be directly connected to the first driving lines and the second driving lines, thereby providing a driving-voltage signal. Referring to FIG. 1 and FIG. 2, the grating regulating device further includes a Flexible Printed Circuit (FPC) 6, and the driving unit 5 may be bonded to the FPC 6.

The groups of the first driving lines may, as shown in FIG. 19, be all electrically connected to one driving unit, or the groups of the first driving lines may be divided into two parts, where one part is electrically connected to one driving unit, and the other part is electrically connected to another driving unit, which is not limited herein. Likewise, the groups of the second driving lines may, as shown in FIG. 19, be all electrically connected to one driving unit, or the groups of the second driving lines may be divided into two parts, where one part is electrically connected to one driving unit, and the other part is electrically connected to another driving unit, which is not limited herein.

Optionally, referring to FIG. 19, the grating regulating device further includes a grating region G1, and a non-grating region G2 connected to the grating region G1. The first electrode layer (including the first sub-electrodes 311) and the second electrode layer (including the second sub-electrodes 321) are provided within the grating region G1, and the plurality of first driving lines 41 and the plurality of second driving lines 42 are provided within the non-grating region G2.

Certainly, the first driving lines and the second driving lines may also be provided within the grating region. However, if the first driving lines and the second driving lines are provided within the grating region, brightness moire patterns might be formed, which affects the grating units. Therefore, it may be selected that the first driving lines and the second driving lines are provided within the non-grating region.

In order to reduce the provision of the traces and simplify the process, one end of each of the first sub-electrodes extends to the non-grating region, and is connected to a corresponding first driving line, and one end of each of the second sub-electrodes extends to the non-grating region, and is connected to a corresponding second driving line. Accordingly, it can be realized without additionally providing lead wires that the first sub-electrodes and the first driving lines are electrically connected, and the second sub-electrodes and the second driving lines are electrically connected, to be simply and easily implemented.

An embodiment of the present application further provides a 3D displaying device. Referring to FIG. 1, FIG. 2 and FIG. 18, the 3D displaying device includes a display panel 200 and the grating regulating device 100 stated above. The grating regulating device 100 and the display panel 200 face each other.

The grating regulating device may be provided on the light exiting side of the display panel, in which case the grating regulating device may be referred to as a front-placed grating. Alternatively, as shown in FIG. 1, FIG. 2 and FIG. 18, the grating regulating device 100 may be provided on the shadow side of the display panel 200, in which case the grating regulating device may be referred to as a rear-placed grating, which is not limited herein.

The type of the display panel is not limited, and its type may be a liquid-crystal display panel of an ADS type, an IPS type and so on, which is not limited herein. Furthermore, if the display panel is a liquid-crystal display panel, then the 3D displaying device may further include a backlight module, to provide backlight. If the grating regulating device is provided on the shadow side of the display panel, the backlight module may be provided on the shadow side of the grating regulating device. Certainly, if the grating regulating device is provided on the light exiting side of the display panel, the backlight module may be provided on the shadow side of the display panel.

The 3D displaying device can greatly alleviate or even eliminate the problem of ghosting, thereby highly improving the user experience and the product quality.

Optionally, in order to track the movement of the eyeballs in real time, the 3D displaying device includes an eyeball tracking module, and the eyeball tracking module is configured to acquire a watching distance.

The eyeball tracking module may include a camera. The grating regulating device can, according to shooting information of the eyeball tracking module, by using a relevant eyeball tracking technique, parse data such as the eyeball positions, and, accordingly, according to the data such as the eyeball positions, acquire the watching distance, and adjust the grating units in real time, so as to match the positions of the user viewpoints to the largest extent, thereby greatly alleviating or even eliminating the problem of ghosting, and improving the user experience and the product quality.

By using the grating regulating device to form the 3D displaying device, its advantages are that the free switching between the 2D displaying and the 3D displaying can be realized, and that, in the 2D displaying, the grating regulating device is turned off, to have little influence on the transmittance of the 2D displaying.

Optionally, the display panel includes a touch-controlled display panel. As shown in FIG. 1, FIG. 2 and FIG. 18, the grating regulating device 100 is provided on the shadow side of the display panel 200. That can prevent the influence on the effect of touch controlling by the grating regulating device, thereby improving the quality of touch controlling.

The touch-controlled display panel may employ the TDDI (touch controlling and displaying integration) touch-controlling technique. The touch-controlling component is not limited herein, and may be particularly obtained according to the related art.

Optionally, in order to realize the effect of 3D displaying, referring to FIG. 1, FIG. 2 and FIG. 18, the grating regulating device 100 includes a grating region G1, and a non-grating region G2 connected to the grating region G1. The display panel 200 includes a displaying region AA, and a non-displaying region BB connected to the displaying region AA. The displaying region AA covers the grating region G1, and the non-displaying region BB covers the non-grating region G2.

The displaying region of the display panel is used to provide the pixels, to realize the displaying. The non-displaying region is used to provide the driving circuit and so on.

Optionally, in order to simplify the process, referring to FIG. 1 and FIG. 2, the grating regulating device 100 includes the first substrate 1 and the second substrate 2 that face each other, and the display panel 200 includes a third substrate 9 and a fourth substrate 10 that face each other. The second substrate 2 and the third substrate are adhered; for example, they may be adhered by using the double-sided adhesive tape 13 shown in FIGS. 1 and 2.

Certainly, as shown in FIG. 1 and FIG. 2, the display panel may further include components such as a color-film layer 17, a first block sealing adhesive 15, a driving chip 7 and a circuit board 8, and the grating regulating device may further include components such as a second block sealing adhesive 14 and an insulating layer 18. Merely the contents that are relevant to the inventiveness are described herein, and the other components may be obtained with reference to the related art.

The description provided herein describes many concrete details. However, it can be understood that the embodiments of the present application may be implemented without those concrete details. In some of the embodiments, well-known processes, structures and techniques are not described in detail, so as not to affect the understanding of the description.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A grating regulating device, wherein the grating regulating device is applied to a 3D displaying device, the 3D displaying device comprises a display panel, the display panel comprises a first polarizing unit, the grating regulating device is provided on one side of the display panel away from the first polarizing unit, and the grating regulating device comprises:

a first substrate and a second substrate, wherein the first substrate and the second substrate face each other;

a second polarizing unit provided on one side of the second substrate away from the first substrate; and a third polarizing unit provided on one side of the first substrate away from the second substrate; and an absorption axis of the first polarizing unit and an absorption axis of the second polarizing unit are perpendicular, and the absorption axis of the second polarizing unit and an absorption axis of the third polarizing unit are perpendicular;

wherein the grating regulating device further comprises an electrode layer, and the electrode layer is provided on one side of the first substrate away from the third polarizing unit; and an included angle θ between the absorption axis of the third polarizing unit and an extension direction of the electrode layer satisfies 0°<θ<180°, and θ≠90°;

wherein the absorption axis of the third polarizing unit is parallel to the first substrate, and the electrode layer comprises a plurality of electrode parts, and neighboring instances of the plurality of electrode parts are electrically connected; and each of the plurality of electrode parts comprises a first sub-electrode part and a second sub-electrode part, the first sub-electrode part and the second sub-electrode part are electrically connected, and an extension direction of the first sub-electrode part and an extension direction of the second sub-electrode part are different.

2. The grating regulating device according to claim 1, wherein neighboring instances of the plurality of electrode parts directly contact, and the first sub-electrode part and the second sub-electrode part directly contact; or the electrode layer further comprises corner parts, neighboring instances of the plurality of electrode parts are connected by the corner parts, and the first sub-electrode part and the second sub-electrode part are connected by the corner parts.

3. The grating regulating device according to claim 2, wherein the electrode layer comprises a first sub-electrode layer and a second sub-electrode layer, the second sub-electrode layer is provided between the first sub-electrode layer and the first substrate, the first sub-electrode layer comprises a plurality of first sub-electrodes arranged in a first direction, and the second sub-electrode layer is provided at a whole surface; and each of the first sub-electrodes comprises the plurality of electrode parts.

4. The grating regulating device according to claim 2, wherein the electrode layer comprises a first sub-electrode layer and a second sub-electrode layer, the second sub-electrode layer is provided between the first sub-electrode layer and the first substrate, the first sub-electrode layer comprises a plurality of first sub-electrodes arranged in a first direction, the second sub-electrode layer comprises a plurality of second sub-electrodes arranged in the first direction, and orthographic projections of the first sub-electrodes on the first substrate and orthographic projections of the second sub-electrodes on the first substrate are alternately arranged; and each of the first sub-electrodes comprises the plurality of electrode parts, and each of the second sub-electrodes comprises the plurality of electrode parts.

5. The grating regulating device according to claim 2, wherein the electrode layer comprises a third sub-electrode layer, the third sub-electrode layer is provided on one side of the first substrate away from the third polarizing unit, the third sub-electrode layer comprises a plurality of third sub-electrodes arranged in a first direction and a plurality of fourth sub-electrodes arranged in the first direction, and the third sub-electrodes and the fourth sub-electrodes are arranged alternately and separately; and each of the third sub-electrodes comprises the plurality of electrode parts, and each of the fourth sub-electrodes comprises the plurality of electrode parts.

6. The grating regulating device according to claim 1, wherein an included angle between the absorption axis of the second polarizing unit and the second substrate is 90°, and an included angle between the absorption axis of the third polarizing unit and the first substrate is 0°.

7. The grating regulating device according to claim 1, wherein the included angle θ between the absorption axis of the third polarizing unit and the extension direction of the electrode layer satisfies 5°-85°.

8. A 3D displaying device, wherein the 3D displaying device comprises a display panel and the grating regulating device according to claim 1; and the grating regulating device and the display panel face each other.

9. The 3D displaying device according to claim 8, wherein the 3D displaying device further comprises an eyeball tracking module, and the eyeball tracking module is configured to acquire a watching distance.

10. The grating regulating device according to claim 4, wherein the grating regulating device further comprises a plurality of grating units arranged in the first direction, the grating units comprise the plurality of first sub-electrodes and the plurality of second sub-electrodes, and the grating units are configured to, when the grating regulating device is powered on, be capable to form light transmitting units and light shielding units;

the grating regulating device further comprises a plurality of first driving lines and a plurality of second driving lines; and the first sub-electrodes are electrically connected to different instances of the plurality of first driving lines, and the second sub-electrodes are electrically connected to different instances of the plurality of second driving lines.

11. The grating regulating device according to claim 10, wherein the grating regulating device further comprises one or more driving units; and the first driving lines and the second driving lines are electrically connected to at least one of the driving units.

* * * * *